United States Patent [19]

Ogawa et al.

[11] 4,030,577
[45] June 21, 1977

[54] NEGATIVE DISC BRAKE WITH A CLEARANCE-TAKEUP MECHANISM

[75] Inventors: Yutaka Ogawa, Tokyo; Hiroshi Hirai, Saitama, both of Japan

[73] Assignees: Akebono Brake Industry Co., Ltd.; Ishikawajima-Harima Jukogyo Kabushiki Kaisha, both of Tokyo, Japan

[22] Filed: Aug. 8, 1975

[21] Appl. No.: 602,991

[30] Foreign Application Priority Data

Aug. 13, 1974   Japan ............... 49-96676

[52] U.S. Cl. .................. 188/71.9; 188/72.4; 188/73.3; 188/170; 188/196 F
[51] Int. Cl.² ........................ F16D 65/56
[58] Field of Search ........... 188/1 R, 71.1, 71.9, 188/72.4, 73.3, 106 F, 106 P, 170, 196 D, 196 F, 196 V, 196 P, 73.4; 192/91 R, 111 A; 92/5 R

[56] References Cited

UNITED STATES PATENTS

| | | | |
|---|---|---|---|
| 2,437,552 | 3/1948 | Quiroz .................... | 92/5 R X |
| 2,533,186 | 12/1950 | Bricker et al. .......... | 188/73.3 |
| 3,186,521 | 6/1965 | Chouings ................ | 188/196 P |
| 3,277,983 | 10/1966 | Jeffries .................. | 188/72.4 X |
| 3,482,655 | 12/1969 | Walther .................. | 188/73.3 |
| 3,502,180 | 3/1970 | Aiki et al. ............... | 188/196 P X |
| 3,520,385 | 7/1970 | Huffman et al. ........ | 188/196 F X |
| 3,590,964 | 7/1971 | Krause ................... | 188/71.9 X |
| 3,656,590 | 4/1972 | Newstead ............... | 188/73.3 |
| 3,661,230 | 5/1972 | Burnett .................. | 188/71.9 |
| 3,726,367 | 4/1973 | Evans ..................... | 188/71.9 X |
| 3,791,492 | 2/1974 | Neilsen .................. | 188/170 |
| 3,874,483 | 4/1975 | Farr ....................... | 188/71.9 |
| 3,944,027 | 3/1976 | Yamamoto .............. | 188/71.9 |

FOREIGN PATENTS OR APPLICATIONS

| | | | |
|---|---|---|---|
| 2,356,203 | 5/1974 | Germany ................ | 188/71.9 |
| 1,253,489 | 11/1971 | United Kingdom ..... | 188/71.9 |

*Primary Examiner*—Trygve M. Blix
*Assistant Examiner*—Edward R. Kazenske
*Attorney, Agent, or Firm*—Toren, McGeady and Stanger

[57] ABSTRACT

A negative disc brake comprising a cylinder assembly having a thrusting mechanism wherein a thrusting force of an actuating spring is normally transmitted to a thrusting piston through an actuating piston and an adjustment screw which is in screwed engagement with the actuating piston; the thrusting piston normally pushes one friction pad against a rotor; however, when a fluid pressure is applied, the actuating piston moves against the thrusting force of the actuating spring in the direction of taking off the brake; and a caliper assembly having a reaction member which pushes another friction pad against the opposite side of the rotor by a reaction force resulting from the thrusting force exerted on the other friction pad to push it against the rotor in the brake applying action of the thrusting mechanism, the caliper assembly and the cylinder assembly being arranged as independent components mountable and dismountable separately from each other.

3 Claims, 13 Drawing Figures

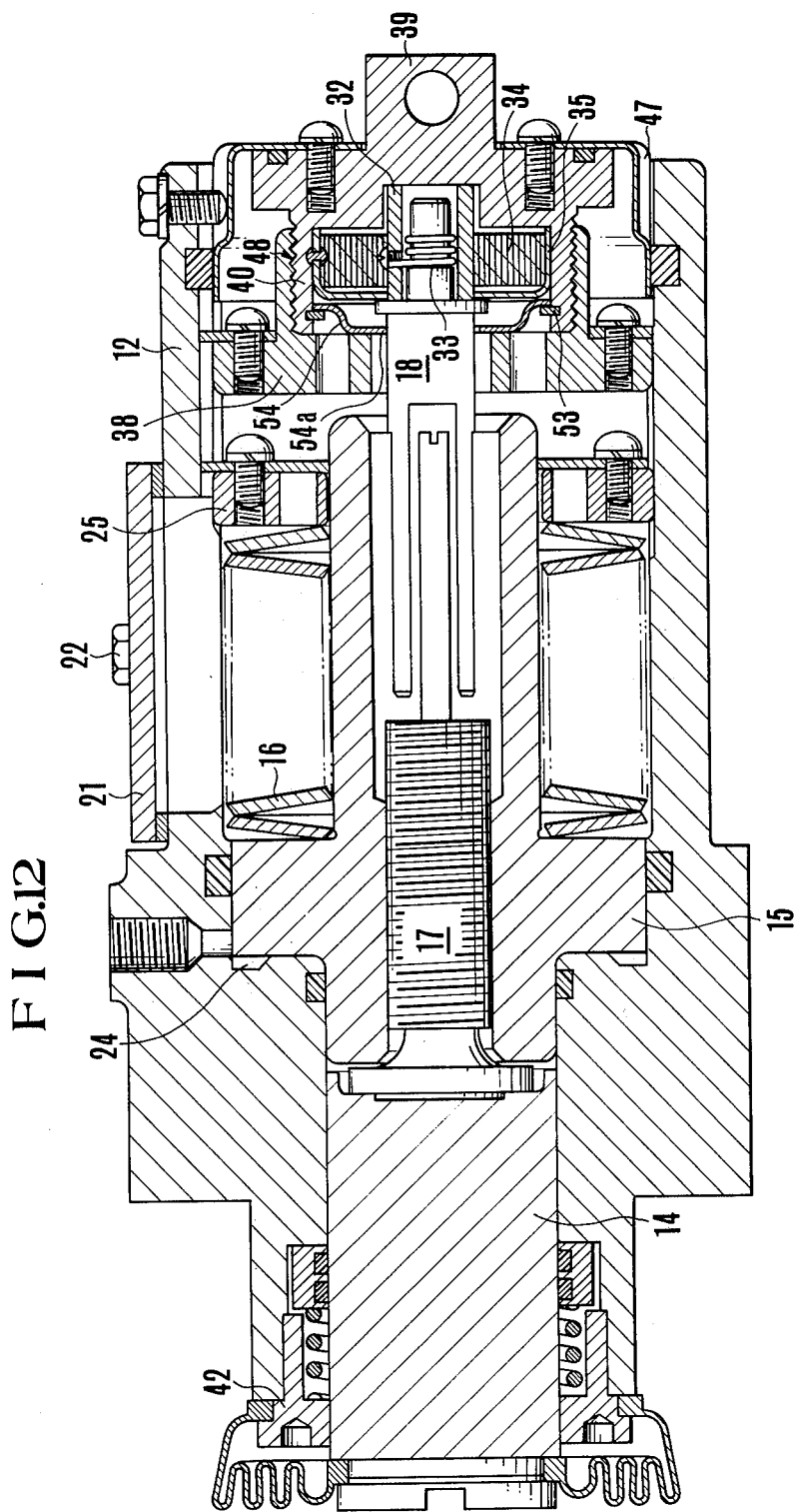

NEGATIVE DISC BRAKE WITH A CLEARANCE-TAKEUP MECHANISM

BACKGROUND OF THE INVENTION

This invention relates to a negative type disc brake which constantly performs a braking operation by pressing friction pads against a rotor by means of an actuating spring disposed inside a cylinder and which is released from the braking operation when a fluid pressure is applied causing it to disengage the friction pads from the rotor.

Generally, in a negative disc brake of the type as described in the foregoing, the thrusting force which presses the friction pads against the rotor derives from an actuating spring disposed in a cylinder. Therefore, where such thrusting force is required in different degrees to ensure satisfactory braking for varied types of equipments, each negative disc brake must be equipped with an actuating spring of a characteristic that suits for a specific equipment. Furthermore, there have been contrived various devices for the automatic adjustment of gaps between thrusting cylinders and rotors according as friction pads wear away in such negative disc brakes.

However, the variation required among negative disc brakes for the above stated reason relates only to the shape and arrangement of a thrusting piston, an actuating spring and an adjustment screw which are contained in a cylinder assembly and not relates to a caliper assembly which is provided with friction pads and arranged to straddle a rotor. The structure of the caliper assembly does not have to vary with the specific negative disc brake employed.

STATEMENT OF OBJECT

It is, therefore, a principal object of this invention to provide a negative disc brake wherein a cylinder assembly and a caliper assembly are respectively arranged to be separate component units which are mountable and dismountable independently of each other, so that the caliper assembly can be manufactured as a common component usable for varied types of negative disc brakes. This not only enables to reduce the manufacturing cost of it through a greatly rationalized production lines but also permits the replacement of a cylinder assembly only instead of a whole negative disc brake unit when a negative brake unit mounted on an equipment becomes faulty.

It is another object of this invention to provide improved means for automatic adjustment.

BRIEF DESCRIPTION OF DRAWINGS

The further objects, features and advantages of this invention will become apparent from the following detailed description of preferred embodiments taken in connection with the accompanying drawings in which:

FIG. 12 is a sectional view illustrating a still another embodiment of this invention across the middle part of it.

DESCRIPTION OF THE INVENTION IN RELATION TO DRAWINGS

Figure 1:
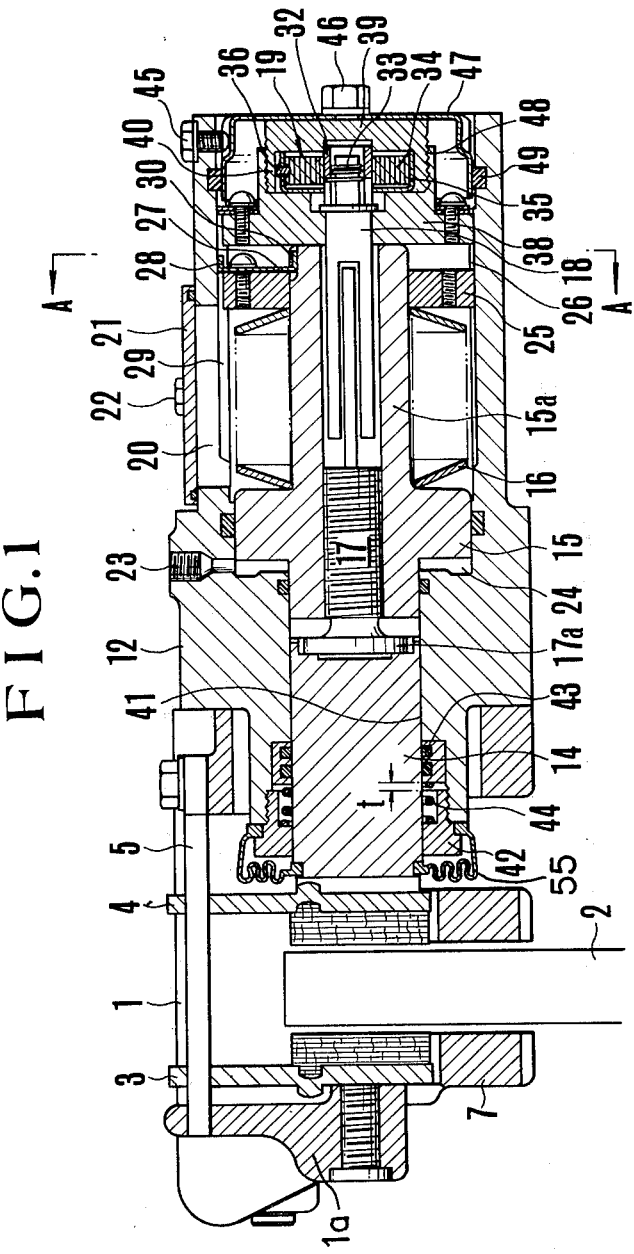
FIG. 1 is a sectional view illustrating a negative disc arranged in accordance with this invention across the middle part of it.
Figure 2:
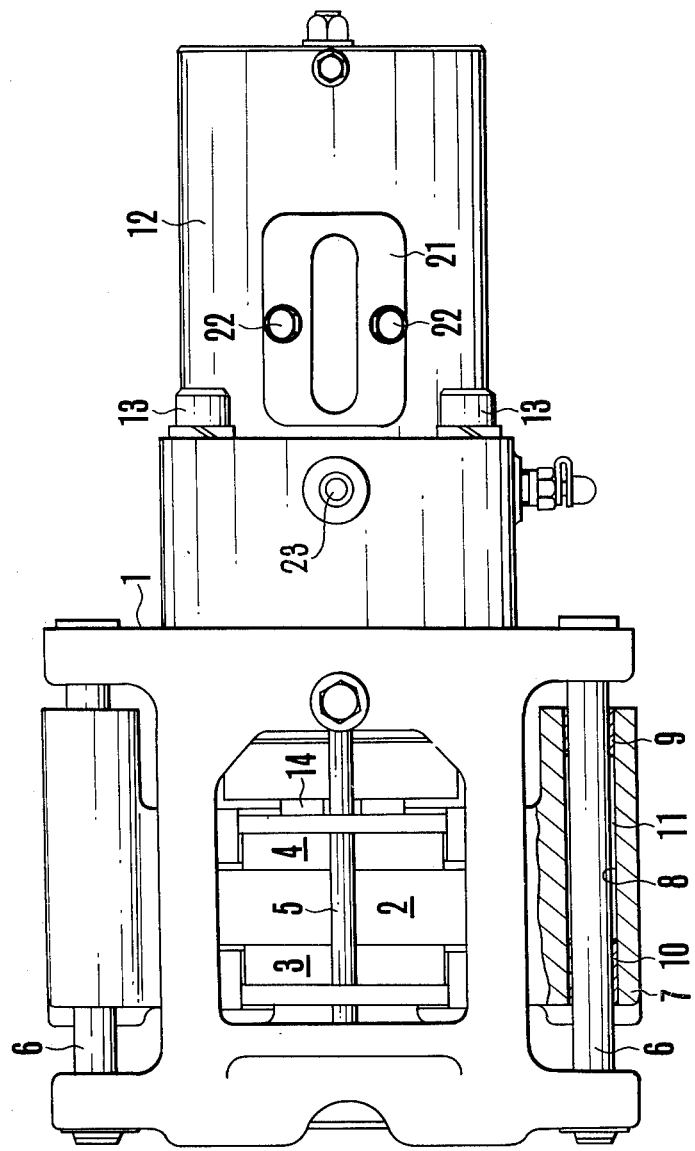
FIG. 2 and FIG. 3 are a top view and a left side view illustrating the negative disc brake of FIG. 1 respectively.
Figure 3:
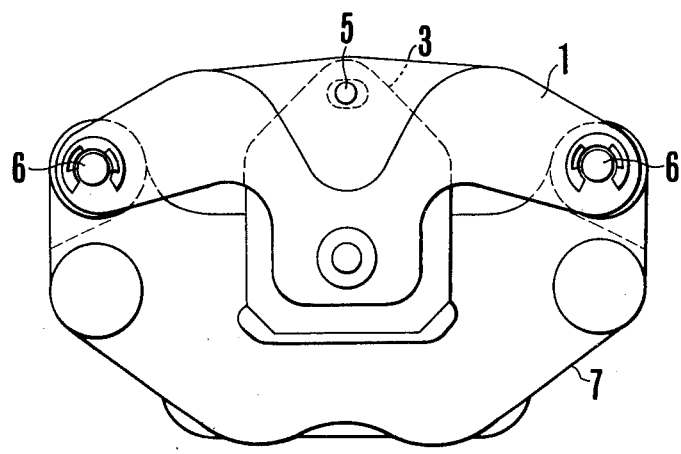
Figure 4:
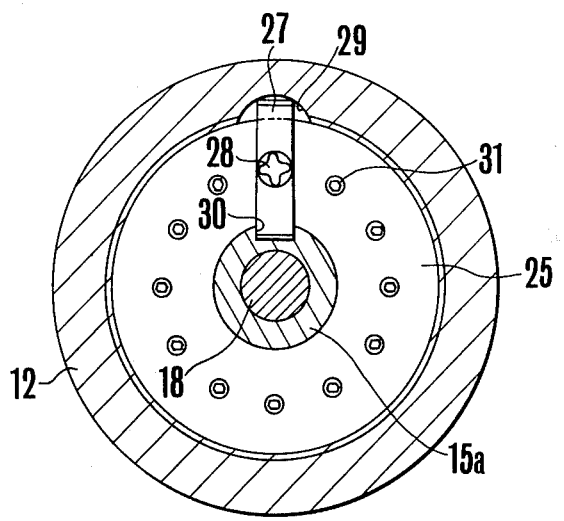
FIG. 4 is a sectional view illustrating the same negative disc brake across the A—A line of FIG. 1.

In FIGS. 1 through 3, a caliper assembly 1 straddles a rotor 2 and is provided with a pair of friction pads 3 and 4, which are assembled by means of a retaining pin 5 and are disposed on both sides of the rotor 2. Caliper guide pins 6 which are secured to both ends of the caliper assembly 1 enable the caliper assembly to be movable on a support 7 in the axial direction of the rotor 2. A pair of antirust bushes 9 and 10 which are made of, for example, a copper alloy are secured to both ends of each guide hole 8 of the support 7 while the above stated guide pins 6 are fitted into the bushes 9 and 10. A gap 11 between each of the guide pins and each of the guide holes is filled with a lubricant to ensure smooth movement of the caliper assembly 1 on the support 7.

A cylinder assembly 12 is secured to the caliper assembly 1 by bolts 13. The cylinder assembly comprises a thrusting piston 14, an actuating piston 15, an actuating spring 16, an adjustment screw 17, a spindle 18 and a spiral spring mechanism 19. In addition to these parts, a window 20 is provided in the cylinder assembly to facilitate the inspection of the mounted or faulty condition of an actuating spring 16, the window being normally closed by a lid 21 and such inspection requires removal of a screw 22. The reference numerals 23 and 24 indicate a hydraulic (or fluid pressure) inlet/outlet and a hydraulic (or fluid pressure) chamber respectively.

The negative disc brake which is arranged as described above works in the same manner as the conventional negative disc brakes. However, with the cylinder assembly 12 secured to the caliper assembly 1 by means of the bolts 13, the cylinder assembly is interchangeable with another cylinder assembly that is more suitable in terms of structure and performance for a specific equipment for which the brake is to be used. In this manner, negative disc brakes of different types can be obtained with the caliper assembly used as a common component. This leads to a reduction in cost.

Furthermore, when an abnormality develops in the hydraulic system of the hydraulic chamber 24 causing the release of the hydraulic (or fluid) pressure of the chamber, the brake can not be taken off the rotor 2. In such cases, however, the cylinder assembly 12 can be separated from the caliper assembly 1 by removing the bolts 13 so that the brake can be readily taken off to facilitate the repair of a faulty part such as a seal.

The actuating spring 16 is disposed between the actuating piston 15 and a stopper 25. The stopper is of a disc-like shape having a hole through which a small diameter portion 15a of the actuating piston 15 pierces. The outer circumference of the stopper 25 is in screwed engagement with a threaded part 26 provided in the inner circumference of the cylinder assembly 12. A lock plate 27 which is provided for preventing the rotation of the stopper 25 is secured to the stopper by a screw 28. One end of the lock plate 27 is arranged to engage with a groove 29 which is provided in the inner circumference of the cylinder assembly 12 in the direction of the bus bar while the other end engages with a groove 30 provided in the small diameter portion 15a of the actuating piston 15. The lock plate 27 also serves to prevent the actuating piston 15 from turning. The stopper 25 has many screw holes 31 which are arranged in the circumferential direction. With these screw holes provided, the thrusting force of the actuating spring 16 can be readily adjusted. For such adjustment, the screw 28 is removed; the lock plate 27 is removed; the stopper 25 is turned; and then the lock plate 27 is refitted using another screw hole provided there. Such adjustment, therefore, permits obtaining a brake torque that is suitable for the specific equipment.

One end of the adjustment screw 17 is connected to a side face of the thrusting piston 14 while the other end is drivingly interlocked with the spindle 18. A sleeve 32 is interlinked with the spindle 18 through a one-way clutch 33 (clutch spring) (see FIGS. 5 and 6). A spiral spring 34 which impart a driving force to the spindle 18 is contained in a casing 35. One end of the spiral spring 34 is secured to the casing 35 with a rivet 36 and the other end to the sleeve 32 with a screw 37 respectively. A piston stopper 38 restricts the rightward movement of the actuating piston 15 which is caused by the hydraulic pressure of the hydraulic chamber 24 when the brake is taken off, the piston stopper being secured to the threaded part 26 of the cylinder assembly 12. A lid member 39 is screwed on the piston stopper 38. The rivet 36 is arranged to engage with a groove 40 of the lid member 39.

While the thrusting piston 14 which is directly pushing the friction pad 4 is fitted in one end of the cylinder 41, a guide bush 42 which is screwed also to the cylinder end slidably supports the end of the thrusting piston 14 on the side of the friction pad 4. This arrangement serves to prevent any twisting that might otherwise result from the extended length of the thrusting piston 14. Furthermore, the guide bush 42 also serves as a retainer for a boot 55 which is provided for the purpose of protecting the sliding part of the thrusting piston 14.

Between a friction ring 43 which frictionally engages with the outer circumference of the thrusting piston 14 and the guide bush 42, there are provided a spring 44 and a gap "$t38$".

The negative brake and the automatic gap adjusting device operate as described below:

FIG. 1 represents a condition wherein the brake has been taken off with the actuating piston 15 having been caused by the hydraulic pressure of the hydraulic chamber 24 to move against the thrusting force of the actuating spring 16 until it comes into contact with the piston stopper 38. When the hydraulic pressure of the hydraulic chamber 24 is removed from this condition, the thrusting force of the actuating spring 16 again causes the friction pad 4 to be pressed against the rotor 2 through the actuating piston 15, adjustment screw 17 and thrusting piston 14. Then by a reacting force resulting from this, the caliper assembly 1 and the cylinder assembly 12 are unified and together slide to the right; and a reacting member 1a comes to press the other friction pad 3 on the rotor 2 to apply the brake. At this moment, the brake torque is absorbed by the support 7. Again, when hydraulic pressure is introduced into the hydraulic chamber 24, the actuating piston 15 is moved to the right by the hydraulic pressure; and then the thrusting force causes the thrusting piston 14 to move back to the right through the friction ring 43 to take off the brake. Now the automatic gap adjusting device operates as follows:

When the abrasive material of the friction pads 3 and 4 wears out and thus causes the moving distance of the thrusting piston 14 in applying the brake to be greater than the above mentioned gap "$t$", the thrusting piston 14 in the stroke of taking off the brake can not retreat a distance greater than the gap "$t$" which corresponds to the normal brake clearance while the backward distance to the piston stopper 38 required for the actuating piston 15 is greater than the gap "$t$". Because of this, there arises a gap between the thrusting piston 14 and the head portion 17a of the adjustment screw 17. To make up the gap, the turning force stored in the spiral spring 34 is transmitted to the spindle 18 through the one-way clutch 33. Then the adjustment screw 17 which is drivingly interlocked with the spindle 18 is caused to screw out. In this manner, the distance between the thrusting piston 14 and the actuating piston 15 becomes greater than before so that the brake clearance between the rotor and the friction pads 3 and 4 can be adjusted by this.

Figure 5:
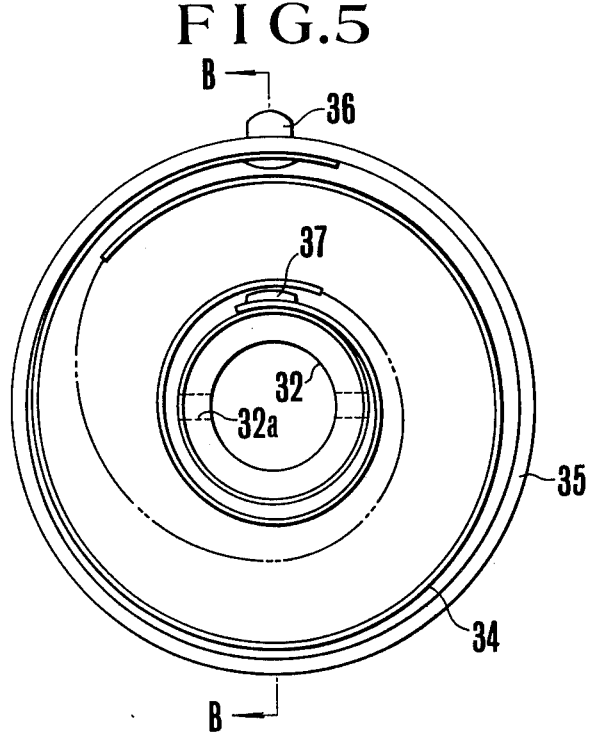
FIG. 5 illustrates a mounted condition of a spiral spring.
Figure 6:
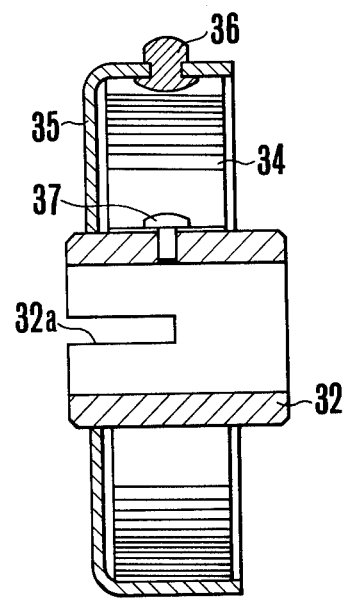
FIG. 6 is a sectional view illustrating the spiral spring across the B—B line of FIG. 5.

For replacing the friction pads 3 and 4 with new pads when their abrasive material has worn out beyond a serviceable limit, the retaining pin 5 is removed and the worn-out pads are taken out. The screw 45 is removed. The lid member 39 is turned by a tool together with a cup-shaped cover 47 which is screwed to the lid member 38 with a nut 46. By this, the lid member 39 is removed from its screwed engagement 48 with the piston stopper 38. Then, the sleeve 32 and the spiral spring 34 which is connected to the casing 35 are also removed. The spindle 18 is pulled out and screwed into the actuating piston 15 by turning the adjustment screw 17 which has been screwed out. In the next place, the thrusting piston 14 is pushed back. The new friction pads 3 and 4 are positioned and held there by means of the retaining pin 5 as shown in FIG. 5. The rivet 36 is arranged to engage with the groove 40 of the lid member 39 while one end of the one-way clutch 33 is also arranged to engage with the groove 32a of the sleeve 32. Then, by applying a spanner (or a wrench) to the nut 46, the lid member 39 is rotated to screw it into the piston stopper 38 and at the same time, to have a turning force stored in the spiral spring 34. Even if the spanner is let off halfway in the work, the lid member 39 would be engaged with the outer circumference of the cover 47 and thus would not be reversely turned by the turning force of the spiral spring 34 because of the frictional force of a resilient ring 49 which is connected to the cylinder assembly 12. The resilient ring 49 also serves to prevent dust and the like from entering the inside of the cylinder assembly 12. The lid member 39 is further screwed into the piston stopper 38 as far as it can go for storing as much turning force as possible in the spiral spring 34. The turning force can be stored as much as the lid member 39 can be turned in screwing the lid member into the stopper 38. Therefore, the number of turns for screwing the lid member 39 to a maximum extent is set to let the spiral spring 34 store a magnitude of turning force that can rotate the adjustment screw 17 as many turns as required from the time when new friction pads 3 and 4 are installed until they wear out requiring replacement. Such setting eliminates the possibility of an inoperative condition of the automatic gap adjusting device due to an insufficient turning force of the spiral spring 34.

Figure 7:
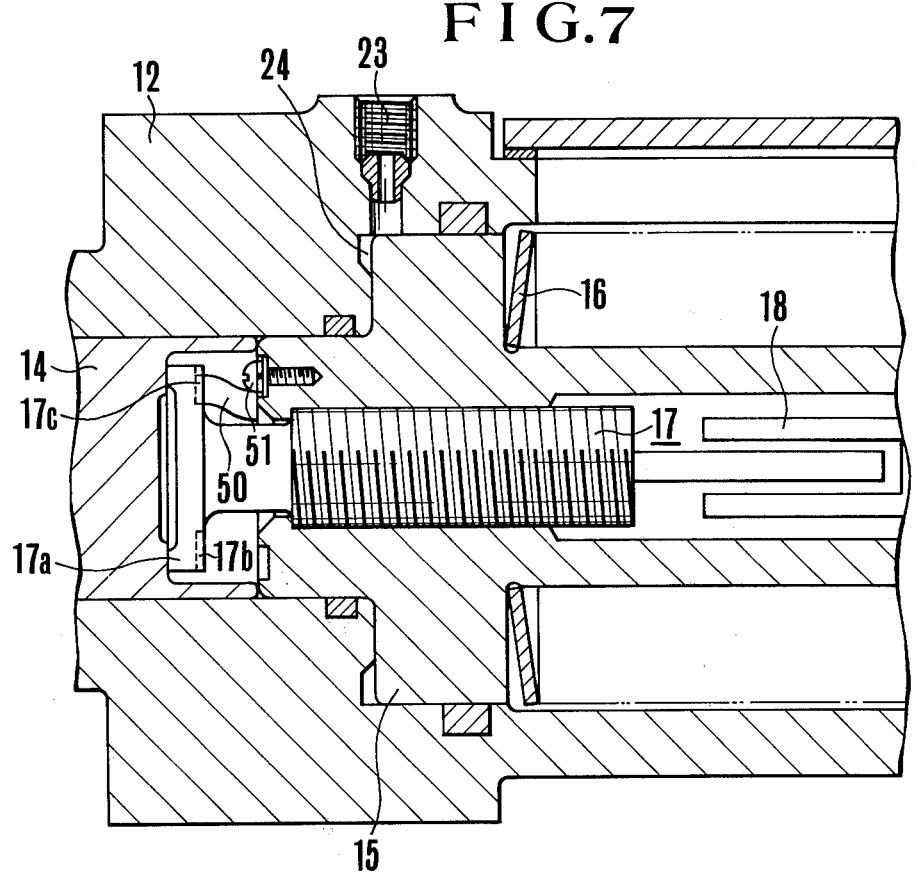
FIG. 7 is a sectional view illustrating the essential parts of another embodiment of this invention.
Figure 8:
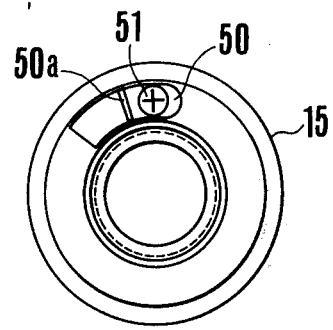
FIG. 8 is a front view illustrating a stopper mounting part.
Figure 9:
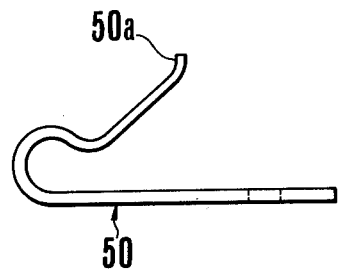
FIG. 9 is an enlarged detailed view illustrating the stopper.

FIG. 7 through FIG. 9 illustrate a modified embodiment of this invention which is arranged to prevent the actuating piston 15 and the head portion 17a of the adjustment screw 17 from interlocking with each other.

In assembling the brake and also in replacing worn-out friction pads, the adjustment screw 17 must be screwed into the actuating piston 15. However, according to what has been learned by experiences, the head portion 17a of the adjustment screw 17 and the end of the actuating piston 15 sometimes become firmly locked in each other during such processes and can not be relieved from such a condition by the turning force of the spiral spring 34. Under such a condition, the brake is incapable of performing the automatic adjusting function according as the abrasive material of the friction pads wears away. This results either in a delayed braking action or in an insufficient braking force.

In this embodiment, there are provided grooves 17b and 17c in the head portion 17a of the adjustment screw 17 in the radial direction on the side facing the actuating piston 15. A stopper 50 is secured to the actuating piston 15 with a screw 51. When the tip 50a of the stopper 50 engages with the groove 17b or 17c, it stops the rotation of the adjustment screw 17 in the inward screwing direction thereof.

The automatic adjusting device arranged as described above operates in the same manner as the conventional device. For screwing the adjustment screw 17 into the side of the actuating piston 15 in assembling the brake or in replacing the friction pads, when the tip 50a of the stopper 50 comes to engage with the groove 17c, the rotation in the inward screwing direction of the adjustment screw 17 is stopped and is prohibited from going further. In this instance, the elasticity of the stopper enables it to engage with the other groove 17b even if it first comes in contact with the head portion 17a of the adjustment screw 17 at a point other than the groove 17c. The stopper 50 serves to stop the rotation of the adjustment screw 17 only in the inward screwing direction thereof.

Figure 10:
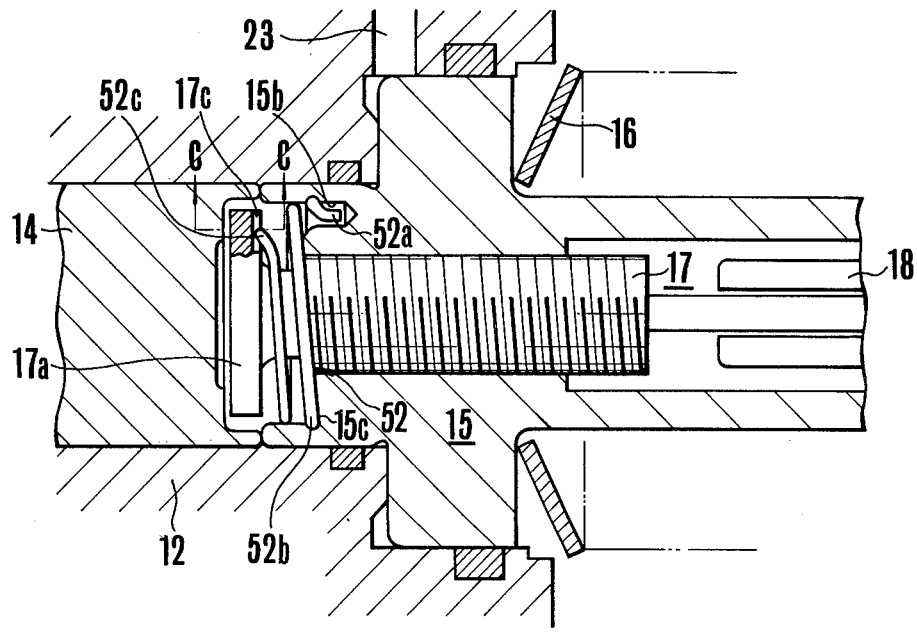
FIG. 10 is a sectional view illustrating the essential parts of another embodiment of this invention.
Figure 11:
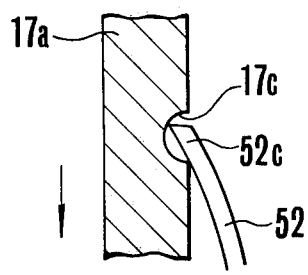
FIG. 11 is a sectional view illustrating the embodiment represented by FIG. 10 across the C—C line indicated in FIG. 10.

FIG. 10 and FIG. 11 illustrate another embodiment of this invention. A barrel-shaped coil spring 52 is provided with a hooked end portion 52a which engages with a hole 15b provided in the axial direction of the actuating piston 15. The greater diameter portion 52b of the spring 52 is arranged to securely engage with the inner circumferential groove 15c of the actuating piston 15 while the other end of the spring 52 is provided with a claw 52c which engages with the above mentioned groove 17c to stop the rotation of the adjustment screw 17 in the inward screwing direction of the screw (indicated by an arrow mark in FIG. 11).

The lock preventing arrangement as described in the foregoing is capable of preventing the adjustment screw and the actuating piston from locking with each other.

Figure 13:
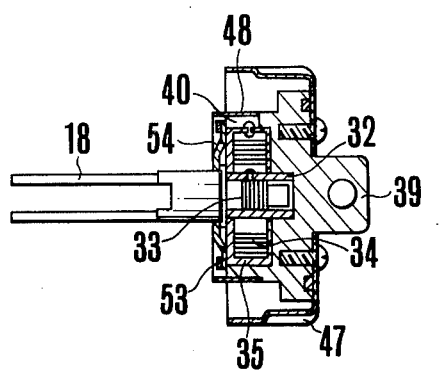
FIG. 13 is a detail view illustrating the spiral spring mounting condition of the embodiment represented by FIG. 12.

FIG. 12 and FIG. 13 illustrate another modified embodiment of the automatic gap adjusting device of this invention.

The spindle 18 is prevented from pulling out from a recess provided in the lid member while the spindle 18 pierces through an aperture 54a provided in a cover plate 54. Since the diameter of the aperture is greater than the diameter of the flange 18a of the spindle 18, the spindle 18 does not pull out of the sleeve 32. The spiral spring 34 also never pulls out of the recess provided in the lid member 39. With such arrangement, a spindle driving mechanism comprising the sleeve 32 which is coupled to the spindle 18, lid member 39, spiral spring 34, casing 35 and cover 47 can be assembled prior to mounting it on the equipment. This eliminates the possibility of erroneous mounting caused by the dropping of the spindle 18 during the mounting work. This not only facilitates the mounting work but also greatly improves the reliability of the equipment.

What is claimed is:

1. A negative disk brake comprising a cylinder assembly having a thrusting mechanism wherein a thrusting force of an actuating spring is normally transmitted to a thrusting piston through an actuating piston and an adjustment screw which is in screwed engagement with the actuating piston; the thrusting piston normally pushing against a rotor a first friction pad disposed on one side of the rotor; said actuating piston moving against the thrusting force of said actuating spring in the direction of taking off the brake when fluid pressure is applied; and a caliper assembly having a reaction member which pushes against the opposite side of the rotor a second friction pad disposed on the opposite side of the rotor by a reaction force resulting from the thrusting force exerted on the first friction pad to push the first friction pad against said rotor in a brake applying action of said thrusting mechanism, the negative disc brake being characterized in that the internal end of a spiral spring which exerts a turning force on said adjustment screw is drivingly coupled to the adjustment screw while the external end of the spiral spring is coupled to a lid member which is secured to a member secured to the cylinder assembly; that a cup-shaped cover is secured to the lid member; and that a resilient ring which engages with the outer circumference of said cup-shaped cover is secured to the inner circumferential end part of the cylinder assembly, said negative disc brake further comprising a spring on the actuating piston for preventing the head portion of the adjustment screw from coming into direct contact with the actuating piston.

2. A negative disc brake as defined in claim 1, wherein said spring is a coil spring which securely engages with an inner circumferential groove provided in said actuating piston.

3. A negative disc brake comprising a cylinder assembly having a thrusting mechanism wherein a thrusting force of an actuating spring is normally transmitted to a thrusting piston through an actuating piston and an adjustment screw which is in screwed engagement with the actuating piston; the thrusting piston normally pushing against a rotor a first friction pad disposed on one side of the rotor; said actuating piston moving against the thrusting force of said actuating spring in the direction of taking off the brake when fluid pressure is applied; and a caliper assembly having a reaction member which pushes against the opposite side of the rotor a second friction pad disposed on the opposte side of the rotor by a reaction force resulting from the thrusting force exerted on the first friction pad to push the first friction pad against said rotor in a brake applying action of said thrusting mechanism, the negative disc brake being characterized in that the internal end of a spiral spring which exerts a turning force on said adjustment screw is drivingly coupled to the adjustment screw while the external end of the spiral spring is coupled to a lid member which is secured to a member secured to the cylinder assembly; that a cup-shaped cover is secured to the lid member; and that a resilient ring which engages with the outer circumference of said cup-shaped cover is secured to the inner circumferential end part of the cylinder assembly, said negative disc brake further comprising a spring on the head portion of the adjustment screw for preventing the actuating piston from coming into direct contact with the head portion of said adjustment screw.

* * * * *